Figure 1:
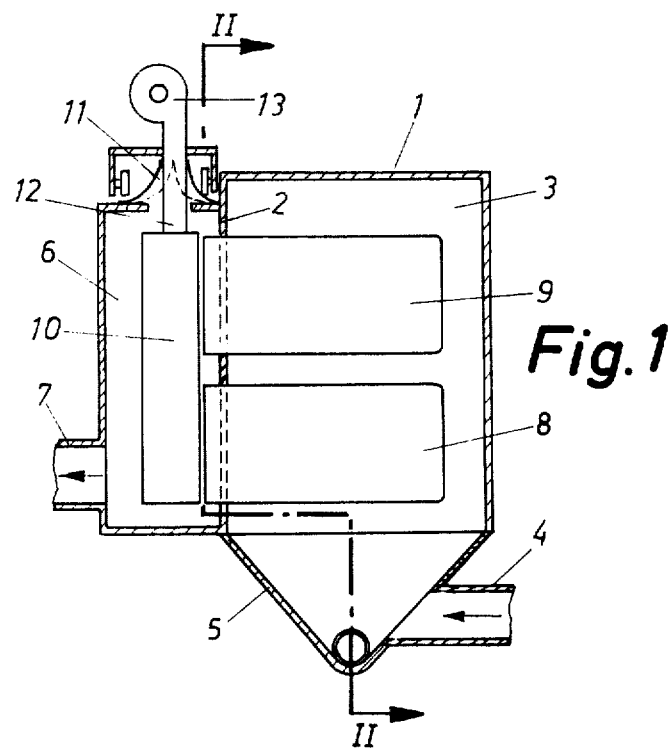

United States Patent
Margraf

[11] 3,883,330
[45] May 13, 1975

[54] POCKET FILTER APPARATUS

[76] Inventor: Adolf Margraf, Im Haberkamp 196, D 4961 Wendthagen, Germany

[22] Filed: Jan. 10, 1974

[21] Appl. No.: 432,165

[52] U.S. Cl. ............ 55/341; 55/343; 55/344; 55/350; 55/361; 55/484; 55/DIG. 12
[51] Int. Cl. ............................................ B01d 46/02
[58] Field of Search ............ 55/284, 294, 302, 341, 55/344, 350, 484, DIG. 12, 343, 361

[56] References Cited
UNITED STATES PATENTS

| | | | |
|---|---|---|---|
| 2,281,610 | 5/1942 | Watson | 55/344 |
| 3,376,696 | 4/1968 | Wells et al. | 55/341 X |
| 3,421,295 | 1/1969 | Swift et al. | 55/341 X |
| 3,605,387 | 9/1971 | Margraf | 55/341 X |

FOREIGN PATENTS OR APPLICATIONS

| | | | |
|---|---|---|---|
| 1,000,457 | 8/1965 | United Kingdom | 55/DIG. 12 |
| 222,629 | 8/1962 | Austria | 55/302 |

Primary Examiner—Frank W. Lutter
Assistant Examiner—Kathleen J. Prunner

[57] ABSTRACT

This invention relates to a pocket filter apparatus for cleaning dust-laden gases. The apparatus is of the kind that comprises a housing divided by a slotted wall into two chambers, one for the dust-laden gas and one for the cleaned gas and in which a plurality of filter pockets having open edges are mounted in the first chamber, and through which pockets the dust-laden gas is passed upwardly from the exterior to the interior. Conventionally, these filter pockets are laterally spaced and mounted in the first chamber in at least two rows lying one above the other with the open edges of the filter pockets covering the slots in the slotted wall. In order to increase the efficiency of such filters, the invention proposes that the filter pockets of a lower row nearest the inlet are laterally spaced apart by a distance greater than the distance between the filter pockets in the row immediately above said lower row and preferably the spacing in the lower row is twice that in the upper row.

6 Claims, 2 Drawing Figures

3,883,330

POCKET FILTER APPARATUS

The present invention relates to pocket filter apparatus of the kind comprising a housing divided by a slotted wall into a chamber for dust-laden gas, and a chamber for cleaned gas, a plurality of filter pockets having open edges mounted in the chamber for dust-laden gas, through which pockets the dust-laden gas is passed from the bottom thereof from the exterior to the interior, these filter pockets being mounted in this chamber in at least two rows lying one above another in such fashion that their open edges cover the slots in the slotted wall. Hereinafter such apparatus will be referred to as "of the kind described."

In apparatus of the kind described, problems arise due to the fact that the lower parts of the filtering surfaces of the pockets are subject to a particularly heavy impingement of dust-laden gas and, particularly when the dust is of a clinging nature, this results in the layers of dust building up in these areas of the filters, the greater thickness of dust in these areas greatly hampering or even entirely preventing the dust from dropping into a dust-collecting trough normally located at or near the base of the apparatus, when the filter pockets are cleaned by reverse-flow scavenging and/or joggling. This also occurs when the processes used to cleanse dust or smoke-laden gases containing extremely fine types of dust are ones in which the incoming dust-laden gas is used to feed the dust which settles as a result of periodic cleansing back to the filtering surfaces until the stream of dust-laden gas is saturated in order thereby to agglomerate the fine dust while not increasing the flow-resistance of the filter, or only increasing it slightly, despite the fact that very large quantities of dust are then present in the filter.

The more intensive impingement on the lower parts of the filtering surfaces of the pockets may be attributed to the fact that the flow-section for the dust-laden gas entering the filter is very much reduced due to the width of the filter pockets and so the velocity of the dust-laden gas rises very markedly at this point and it is the lower parts of the filter pockets on which the dust-laden gas impinges with particular intensity, (which results in heavy deposits of dust on these parts of the filtering surfaces,) following which velocity falls off markedly over the vertical extent of the filter pockets and so the dust-laden gas is no longer capable of carrying the coarser dust upwards with it, the velocity of the dust-laden gas falling to zero at the top of the pockets. In certain circumstances, this could probably be avoided by increasing the lateral distance between all the filter pockets to an appropriate degree, but the result of this would be that the total area of filtering surface housed in the filter would be greatly reduced and thus the efficiency of the filter impaired, even apart from the fact that it would still not be possible to prevent the deposit of dust from being concentrated on the lower parts of the filtering surfaces.

The object of the invention is, as far as possible, to prevent thicker layers of dust from being deposited on the lower parts of the filtering surfaces, while still housing the greatest possible area of filtering surface in a given space.

This object is achieved in apparatus of the kind described by having the filter pockets of a lower row thereof laterally spaced apart by a distance greater than that of the next row thereabove. In a preferred embodiment, said greater distance is twice that of the said next row above.

Using this arrangement it is possible for the speed of the dust-laden gas entering the filter to rise only slightly as a result of the greater cross-sectional area between the filter pockets in the bottom row, and for the velocity then to be allowed to drop only slightly and gradually over the vertical extent of the upper row of pocket filters until it reaches the value zero, with the result that the impingement of dust-laden gas onto the pocket filters in both rows is as uniform as possible and the dust from the dust-laden gas to be cleansed is deposited on the filtering surfaces with a uniform or practically uniform distribution over the vertical extent of the filter pockets. By dividing the filter pockets into at least two rows lying one above the other it is possible, despite the greater lateral spacing between the filter pockets in the lower row, to employ the volume of space in the dust-laden gas chamber to house a large area of filtering surface, it being possible as a result of the favorable way in which the flow-rates of the dust-laden gas are distributed over the vertical extent of the rows of filter pockets to set the specific impingement on the filter surfaces at a higher level than before and thus to reduce the initial cost of the filter apparatus as a result of the reduction in the total filtering surface.

Figure 2:
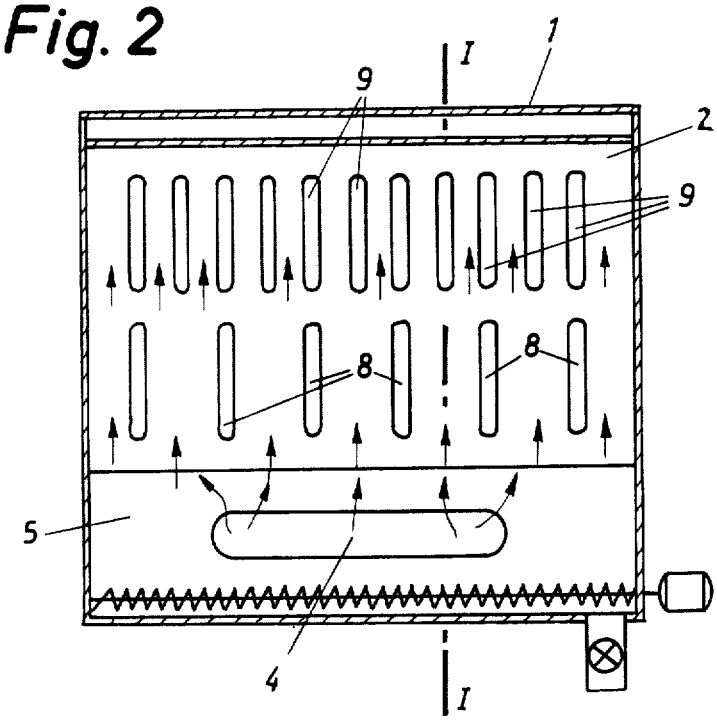

In order that the invention may be clearly understood, reference will now be made to the accompanying drawings which show one embodiment thereof by way of example and in which:

FIG. 1 shows a vertical section through such pocket filter apparatus along line I—I of FIG. 2, and FIG. 2 shows a vertical longitudinal section along the broken line II—II of FIG. 1.

Referring now to the embodiment shown in the drawings, a housing 1 of a pocket filter apparatus is divided in a known way by a slotted wall 2 into a chamber 3 for dust-laden gas which has a lower infeed 4 for dust-laden gas opening into a dust-collecting trough 5 which may, for example, be fitted with a screw conveyor for removing dust, and into a clean gas chamber 6 with an outlet 7 for clean gas.

The filter pockets 8 and 9, through which the dust-laden gas passes from the outside to the inside, are arranged above one another in the dust-laden gas chamber 3 in two or more rows and their open edges are secured to the slotted wall 2 in a sealed fashion so as to cover the slots therein. At the same time, the filter pockets 8 in the lower row are at a greater distance laterally from one another than those in the upper row 9, the lateral distance between the lower pockets 8 being advantageously twice as great as that between filter pockets 9. With reference to each of FIGS. 1 and 2, as in conventional apparatuses there is a reverse-flow reciprocatable slotted nozzle structure 10, generally referred to herein as slotted nozzle 10, having slotted nozzles therein conventionally positioned for the flow of gas therefrom in reverse directions into the slots within the slotted wall 2. As a result of the spacing of the pockets it is not necessary to alter the straight path followed by the conventional slotted nozzle 10 which traverses back and forth in the clean gas chamber 6 when the filter pockets are periodicially cleaned by reverse-flow scavenging. In the embodiment as shown as in FIG. 2, the distance between the lower filter pockets 8 is uniform between adjacent filter pockets, and accordingly the distance between the matching slots in the slotted nozzle structure would be uniformly spaced in the same manner for matching with these particular lower filter pockets and the slots to which they are mounted within wall 2; if the distance between the lower filter pockets 8 is different, the slotted nozzle will need to be adapted to it. The slotted nozzle 10 is connected to a scavenging blower 13, which can be traversed back and forth with the nozzle, by a pipe 12 which passes through a flap-seal 11, but it is also possible to employ flexible connections which permit the slotted nozzle to move in the clean gas chamber.

As a result of the infeed for the dust-laden gas being at the bottom (which infeed, when the speed of inflow is set at a suitable level and when gases containing very fine dust are being filtered, can be used to feed back the dust settling during cleansing as a carrier until the dust-laden gas is saturated, so as thereby to agglomerate the dust particles) and as a result of the greater distance between the filter pockets in the bottom row 8, the dust-laden gas, as already mentioned, is made to impinge on all the filter pockets in a uniform fashion and the dust is made to collect uniformly on the filter surfaces, since the velocity of the incoming dust-laden gas is now increased only negligibly when it passes through the gaps into the lower row of pockets (where the cross-sectional area is reduced due to the width of the pockets), and it now also passes through the gaps in the upper row of pockets 9 with less fall-off in speed relative to its entry velocity, since here also there is an increase in the velocity of the dust-laden gas due to the reduction in the total flow section, this velocity having dropped over the vertical extent of the lower row of pockets due to the amounts of gas which flowed through the filtering surfaces of the pockets.

It is true that, in comparison with filter pockets which are continuous in the vertical direction or with filter pockets arranged in rows containing the same number of filters, the greater distance in accordance with the invention between the pockets in the lower row gives a somewhat reduced total area of filter surface but, as tests have shown, this may be ignored since it is compensated for by the present invention's resulting more uniformly distributed dust-laden gas at the time of its filtration, i.e. there is less filtration per unit surface area for the same quantity of gas as compared to as heretofore prior art embodiments of filter apparatuses of this type, the present invention accordingly resulting in more widely distributed impingement of the dust-laden gas over available filter surfaces such that greater efficiency is now possible, this having the advantage that the total area of filtering surface is reduced and the initial cost thus lowered.

The invention prevents heavy deposits of dust on the lower parts of the filter pockets usual in known systems and the difficulties which this causes, and uniform distribution of dust is achieved over the vertical extent of the filter surface in both rows of filter pockets since, as a result of the gradual fall-off in the velocity of the dust-laden gas in its upward progress, even the coarser particles of dust can be transported to the upper row of filter pockets and there filtered out.

I claim:

1. In a pocket filter apparatus including a housing structure defining an enclosure therein and having an apertured wall mounted within the housing dividing the enclosure into a first chamber for a dust-laden gas and a second chamber for a clean gas, and the housing structure defining an inlet port into the first chamber, an outlet port out of the second chamber, with the apertured wall defining through-apertures of communication between the first chamber and the second chamber, and having a plurality of separate filter pockets separately mounted extending into the first chamber from and at least one open-end of each filter pocket mounted in at least one of the through-apertures for all through-apertures thereby sealing the first chamber from the second chamber, the improvement being: said through-apertures and respective ones of said filter pockets mounted therein being spaced-apart from one another at predetermined greater distances from one another at locations in juxtaposition to said inlet port than remaining other ones of said filter pockets spaced-apart from one another.

2. The improvement of claim 1, in which said inlet port is located at a location in juxtaposition to one edge of said apertured wall, and in which said pocket filters are mounted extending in substantially parallel arrangement one to another in a plurality of consecutive rows with the consecutive rows being spaced in series consecutively from said inlet port, in which the filter pockets at the locations in the juxtaposition form a first row and said remaining other ones form at least a second row.

3. The improvement of claim 2, in which filter pockets of the respective first and second rows are substantially laterally-spaced-apart substantially-uniformed distances from one another and in substantially parallel relationship from one another.

4. The improvement of claim 3, in which spaced-apart distances between filter pockets of said first row more closely located to said inlet port are substantially twice the distances of spaced-apart filter pockets of said second row more distantly located from said inlet port.

5. The improvement of claim 4, in which said apertures are each of a slot configuration, with respective slots extending in directions substantially parallel to one another.

6. The improvement of claim 1, in which said through-apertures are each of a slot configuration, with respective slots extending in substantially parallel relationship to one another.

* * * * *